(12) United States Patent
Cao et al.

(10) Patent No.: US 12,401,200 B2
(45) Date of Patent: Aug. 26, 2025

(54) PHYSICALLY SYNCHRONIZED SOLAR-STORAGE HYBRID POWER GENERATION SYSTEM AND WORKING METHOD THEREOF

(71) Applicant: SHANDONG UNIVERSITY, Shandong (CN)

(72) Inventors: Yongji Cao, Jinan (CN); Hengxu Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/016,094

(22) PCT Filed: Feb. 23, 2022

(86) PCT No.: PCT/CN2022/077498
§ 371 (c)(1),
(2) Date: Jun. 24, 2024

(87) PCT Pub. No.: WO2023/108890
PCT Pub. Date: Jun. 22, 2023

(65) Prior Publication Data
US 2024/0405564 A1  Dec. 5, 2024

(30) Foreign Application Priority Data
Dec. 15, 2021  (CN) .......................... 202111534480.6

(51) Int. Cl.
*H02J 3/38* (2006.01)
*H02J 3/24* (2006.01)
*H02J 3/32* (2006.01)

(52) U.S. Cl.
CPC ................ *H02J 3/381* (2013.01); *H02J 3/24* (2013.01); *H02J 3/32* (2013.01); *H02J 2300/24* (2020.01)

(58) Field of Classification Search
CPC ...... H02J 3/38; H02J 3/381; H02J 3/32; H02J 2300/24; H02J 3/24
See application file for complete search history.

(56) References Cited

FOREIGN PATENT DOCUMENTS

| CN | 106602608 A | 4/2017 |
|---|---|---|
| CN | 107230974 A | 10/2017 |

(Continued)

OTHER PUBLICATIONS

Sep. 1, 2022 International Search Report issued in International Patent Application No. PCT/CN2022/077498.

(Continued)

*Primary Examiner* — Robert L Deberadinis
(74) *Attorney, Agent, or Firm* — Oliff PLC

(57) ABSTRACT

A physically synchronized solar-storage hybrid power generation system includes: a PV module, including a PV unit, a first converter unit, and a second converter unit electrically connected to the PV unit; an energy storage module, including an energy storage unit and a third converter unit, first and second ends of the energy storage unit being electrically connected to the first and third converter units, respectively; a grid connection module, a first end thereof electrically connected to the second and third converter units, and a second end thereof connected to a target large power grid; and a control module electrically connected to the PV, energy storage, and grid connection modules, and configured to set control parameters of the system and adjust an operating state of the energy storage unit by judging a logical relationship between powers of the PV unit and of the target large power grid for synchronous grid connection.

10 Claims, 4 Drawing Sheets

(56) References Cited

FOREIGN PATENT DOCUMENTS

| | | |
|---|---|---|
| CN | 107872070 A | 4/2018 |
| CN | 113690946 A | 11/2021 |

OTHER PUBLICATIONS

Sep. 1, 2022 Written Opinion issued in International Patent Application No. PCT/CN2022/077498.

PHYSICALLY SYNCHRONIZED SOLAR-STORAGE HYBRID POWER GENERATION SYSTEM AND WORKING METHOD THEREOF

CROSS-REFERENCES TO RELATED APPLICATIONS

This application claims priority benefits to Chinese Patent Application No. 202111534480.6, filed 15 Dec. 2021, the contents of which are incorporated herein by reference.

TECHNICAL FIELD

The present invention belongs to the field of new energy technology, and in particularly, relates to a physically synchronized solar-storage hybrid power generation system and a working method thereof.

BACKGROUND

The statements in this section merely provide background information related to the present invention, and do not necessarily constitute prior art.

With the increasing depletion of energy and the growing demand for environmental protection, new energy generation technologies have received widespread attention and vigorous promotion, and one of the representative technologies is solar photovoltaic (PV) power generation, but the high level of installed capacity thereof and the large-scale grid connection have brought new challenges to the power system.

Generating power utilizing solar energy is severely restricted by the randomness of solar irradiation. Because the power generating capacity thereof depends on uncontrollable factors such as time and meteorological conditions, the time and output of the solar power generation cannot be adjusted according to the real-time load, so it is difficult to maintain the active power balance of the power system. PV power generation generally adopts a power electronic converter for grid connection; however, adding a power conversion link between the power supply and power grid will reduce its resistance to disturbance, making the PV power supply prone to outage after a disturbance occurs. The above two points directly lead to the difficulty of PV power generation to provide reliable equivalent inertia and quantitative active power reserve for the power grid as traditional thermal power generation. Therefore, improving the performance of maintaining the power balance of the power system containing solar PV power generation and at the same time enhancing the ability thereof to resist disturbances is an urgent issue in the field of new energy generation.

Fundamentally, the reason why existing PV power generation cannot provide reliable equivalent inertia like thermal power generation is that it does not contain internal rotating devices and does not have inertia in the physical sense; and the reason why it is difficult to provide reliable active power reserve is that its input signal contains uncontrollable parameters. To solve the former problem, studies have been conducted to use power electronic converters to simulate the equivalent inertia and use it for primary frequency regulation by combining control strategies; to solve the latter problem, some PV power generation systems have been equipped with energy storage devices.

However, on the premise that inertia characteristics cannot be obtained due to the absence of rotating devices, the simulation of active power response via control strategies requires the use of electrical energy generated by PV or stored in energy storage devices, which limits the reserve capacity of the active power. In addition, the general solar-storage hybrid power generation system cannot fundamentally improve the ability to resist disturbance even though it uses power electronic devices for grid connection. It can be seen that the existing solar PV power generation system and solar-storage hybrid power generation system cannot meet the demand of the power system for equivalent inertia and active power reserve, and the ability thereof to resist disturbances is insufficient, which limits the further promotion of the solar PV power generation.

SUMMARY

To solve the above problems, the present invention proposes a physically synchronized solar-storage hybrid power generation system and a working method thereof, which uses energy storage devices to enhance the adaptability of the entire power generation system to fluctuations in irradiation conditions, improves the matching degree between power generation and real-time load fluctuations, enhances the anti-disturbance capability of PV power generation, reduces the occurrence of accidental outage accidents, realizes synchronized grid connection of the solar-storage hybrid power generation, reduces the uncontrollability of power generation output, and improves the digestion and acceptance ability of the power system for the PV power generation.

According to some examples, it is a first solution of the present invention to provide a physically synchronized solar-storage hybrid power generation system, using the following technical solution.

The physically synchronized solar-storage hybrid power generation system, comprising:
  a PV module, comprising a PV unit and a first converter unit and a second converter unit electrically connected to the PV unit, respectively;
  an energy storage module, comprising an energy storage unit and a third converter unit, a first end and a second end of the energy storage unit being electrically connected to the first converter unit and the third converter unit, respectively;
  a grid connection module, a first end thereof is electrically connected to the second converter unit and the third converter unit, and a second end thereof is connected to a target large power grid; and
  a control module, being electrically connected to the PV module, the energy storage module and the grid connection module, respectively, and being configured to set control parameters of the PV module and the energy storage module, and to adjust an operating state of the energy storage unit by judging a logical relationship between a power of the PV unit and a power of the target large power grid for synchronous grid connection of the solar-storage hybrid power generation system.

As a further technical limitation, the physically synchronized solar-storage hybrid power generation system further comprises a display module electrically connected to the control module.

As a further technical limitation, the physically synchronized solar-storage hybrid power generation system further comprises a monitoring module electrically connected to the control module, the PV module, the energy storage module and the grid connection module.

As a further technical limitation, the grid connection module comprises a DC motor and a synchronous power generation unit, the synchronous power generation unit comprises a synchronous generator and an excitation device.

According to some examples, it is a second solution of the present invention to provide a working method of a physically synchronized solar-storage hybrid power generation system, employing the physically synchronized solar-storage hybrid power generation system provided in the first solution, and using the following technical solution.

The working method of the physically synchronized solar-storage hybrid power generation system, comprising the following steps:

obtaining a power of a PV unit and determining a power of a target large power grid;

obtaining a starting power of charging of an energy storage unit based on control parameters of a solar-storage hybrid power generation system and the obtained power of the target large power grid; and obtaining an operating state of the energy storage unit by judging a magnitude relationship between the power of the PV unit and the starting power of charging of the energy storage unit, and then carrying out a synchronous grid connection of the solar-storage hybrid power generation system.

As a further technical limitation, the power of the target large power grid is related to the power of the PV unit and the control parameters of the solar-storage hybrid power generation system.

As a further technical limitation, obtaining the power of the target large power grid before obtaining an operating power of the energy storage unit; the power of the target large power grid is determined based on the power of the PV unit, a real-time variation rate of a local load and a ratio coefficient between a daily average value of the local load and a daily average power of the solar PV generation.

Further, the control parameters of the solar-storage hybrid power generation system comprises a transfer coefficient $c_p$ of the energy transfer from the PV unit to the DC motor via the second converter unit, a transfer coefficient $c_b$ of the energy transfer from the energy storage unit to the DC motor via the third converter unit, a transfer efficiency $c_d$ of the energy transfer from the DC motor to the synchronous power generation unit and a transfer efficiency $c_t$ of the energy transfer from the synchronous power generation unit to the target large power grid.

Further, the power of the target large power grid is related to the power of the PV unit, the operating power of the energy storage unit and the control parameters of the solar-storage hybrid power generation system.

As a further technical limitation, when the power of the PV unit is not less than the starting power of charging of the energy storage unit, the PV unit supplies electrical energy to the energy storage unit via the first converter unit, and the energy storage unit is in a charging state, the DC motor only receives the electrical energy supplied by the PV unit via the second converter unit; when the power of the PV unit is less than the starting power of charging of the energy storage unit, the PV unit no longer supplies electrical energy to the energy storage unit via the first converter unit, and the energy storage unit is in a discharging state, the DC motor receives both the electrical energy supplied by the PV unit via the second converter unit and the electrical energy supplied by the energy storage unit via the third converter unit; and if the PV power generation stops, the DC motor only receives the electrical energy supplied by the energy storage unit via the third converter unit.

As a further technical limitation, the DC motor converts the received DC electrical energy into a mechanical energy, which is converted into an AC electrical energy based on the synchronous generator, and then the electrical energy is integrated into the target large power grid after the voltage thereof is adjusted by the excitation device.

Compared with the prior art, the beneficial effects of the present invention are as follows:

1. According to the present invention, realizing the synchronized grid connection of the solar-storage hybrid power generation, and by using the battery storage device, enhancing the adaptability of the whole power generation system to fluctuations in irradiation conditions and improving the matching degree between the power generating capacity and real-time load fluctuations; the combination of the PV power generation and the battery storage device provides more reliable inertia reserves for the power system, which greatly enhances the robustness of the PV power generation to disturbances and reduces the probability of the accidental outage accidents; and, directly improving the accommodation of the power system for the solar PV power generation, and providing a technical guarantee for solar PV to further replace traditional thermal power units.

2. According to the present invention, the structure is simple, which facilitates direct upgrade and transformation on existing solar PV power generation system or solar-storage hybrid power generation system; the effect is remarkable, and being suitable for meeting the power supply demand in areas with highly fluctuating irradiation conditions or load levels, and having a good anti-disturbance capability.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

The examples and features of the examples in the present invention may be combined with each other without conflict.

EXAMPLE 1

According to Example 1, it provides a physically synchronized solar-storage hybrid power generation system.

Figure 1:
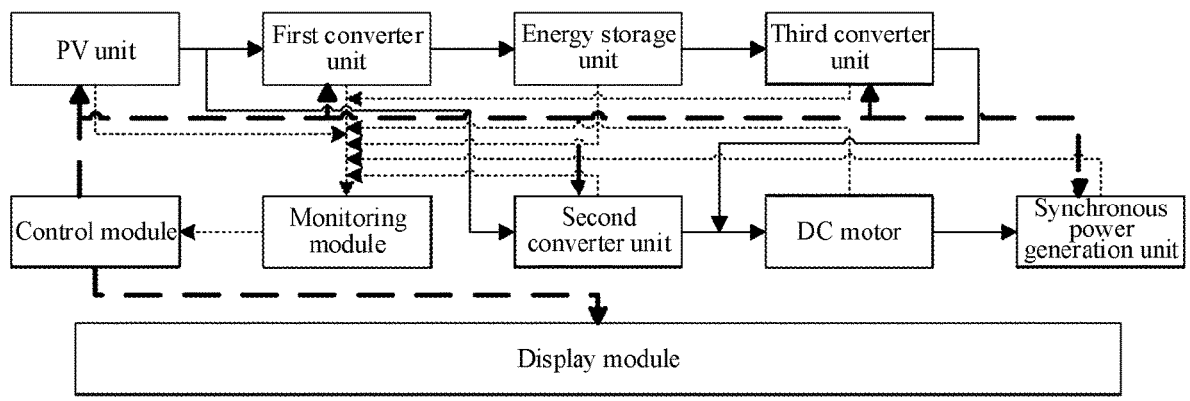
FIG. 1 is a structural block diagram of a physically synchronized hybrid solar-storage power generation system of Example 1 of the present invention.

The physically synchronized solar-storage hybrid power generation system as shown in FIG. 1, comprising: a PV unit, an energy storage unit, a first converter unit, a second converter unit, a third converter unit, a DC motor, a synchronous power generation unit, a control module, a monitoring module, and a display module.

Specifically, the PV unit is connected to the first converter unit and the second converter unit respectively, the first converter unit is used to connect the PV unit and the energy storage unit, and the energy storage unit is provided between the first converter unit and the third converter unit; a first end of the first converter unit far from the PV unit and a first end of the third converter unit far from the energy storage unit are connected to a first side of the DC motor, and a second side of the DC motor is connected to the synchronous power generation unit, and the synchronous power generation unit is then connected to the target large power grid; wherein, the synchronous power generation unit comprises a synchronous generator and an excitation device.

The control module is connected with the PV unit, the first converter unit, the second converter unit, the third converter unit and the synchronous power generation unit, respectively, is configured to control and adjust output powers of the first converter unit, the second converter unit and the third converter unit, and is also able to adjust an excitation voltage of the synchronous generator.

The monitoring module is connected with the PV unit, the energy storage unit, the first converter unit, the second converter unit, the third converter unit, the DC motor, the synchronous power generation unit and the control module, respectively, is configured to monitor the relevant operating parameters of the PV unit, the energy storage unit, the first converter unit, the second converter unit, the third converter unit, the DC motor and the synchronous power generation unit, and at the same time, to transmit the monitoring results to the control module, so that the control module can make timely control adjustments in conjunction with the monitoring results.

The display module is connected to the control module and can display the relevant control parameters of the PV unit, the first converter unit, the second converter unit, the third converter unit and the synchronous power generation unit in real-time, and at the same time, also can display the relevant operating parameters of the PV unit, the first converter unit, the second converter unit, the third converter unit, the DC motor and the synchronous generator in real-time.

In the present example, the PV unit is responsible for converting solar energy into DC electrical energy; the first converter unit is responsible for converting the DC electrical energy generated by the PV unit into the DC electrical energy required by the energy storage unit; the energy storage unit stores the electrical energy input by the first converter unit and is able to output the electrical energy via the second converter unit; the second converter unit is responsible for converting the DC electrical energy released by the energy storage unit into the DC electrical energy required by the DC motor and further controlling the operation of the DC motor; the third converter unit is responsible for converting the DC electrical energy generated by the PV unit into the DC electrical energy required by the DC motor and further controlling the operation of the DC motor; the DC motor is responsible for converting the DC electrical energy input from the second converter unit and the third converter unit into mechanical energy and transmitting it to the synchronous power generation unit; the synchronous power generation unit is responsible for converting the mechanical energy supplied by the DC motor into AC electrical energy and transmitting it to the target large power grid; wherein, the excitation device is responsible for adjusting an on-grid voltage of the synchronous generator.

EXAMPLE 2

According to the present invention, Example 2 provides a working method of a physically synchronized solar-storage hybrid power generation system.

The working method of the physically synchronized solar-storage hybrid power generation system, comprising the following steps:
  obtaining a power of a PV unit and determining a power of a target large power grid;
  obtaining a starting power of charging of an energy storage unit based on control parameters of a solar-storage hybrid power generation system and the obtained power of the target large power grid; and
  obtaining an operating state of the energy storage unit by judging a magnitude relationship between the power of the PV unit and the starting power of charging of the energy storage unit, and then carrying out a synchronous grid connection of the solar-storage hybrid power generation system.

Wherein, the power of the target large power grid is determined by the power of the PV unit, a real-time variation rate of a local load and a ratio coefficient between a daily average value of the local load and a daily average power of the solar PV generation.

Figure 3:
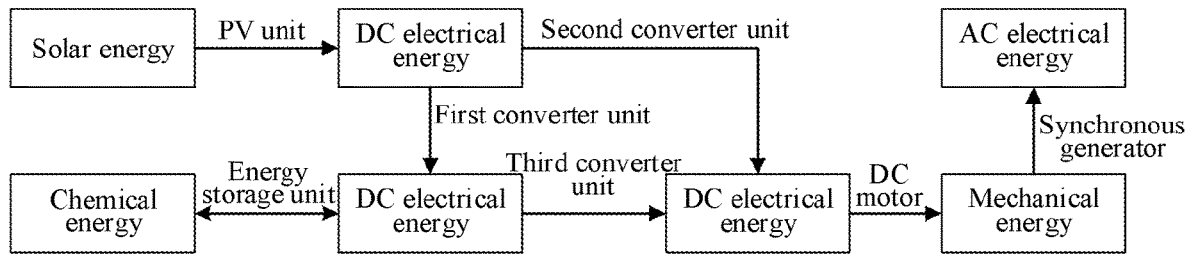
FIG. 3 is a schematic diagram of an energy conversion during an operation of the physically synchronized solar-storage hybrid power generation system of Example 2 of the present invention.

Specifically, as shown in FIG. 3, PV panels in the PV unit convert solar energy into DC electrical energy; the first converter unit is capable of converting the DC electrical energy generated by the PV unit into the DC electrical energy required by the energy storage unit; the energy storage unit converts the DC electrical energy transferred by the first converter unit into chemical energy for storage and converts the stored chemical energy into DC electrical energy for transmission to the third converter unit; the third converter unit converts the DC electrical energy released by the energy storage unit into the DC electrical energy required by the DC motor; the second converter unit is capable of converting the DC electrical energy generated by the PV unit into the DC electrical energy required by the DC motor; the DC motor is capable of converting the DC electrical energy transferred by the second converter unit and the third converter unit into mechanical energy and transferring the mechanical energy to the synchronous generator; the synchronous generator is capable of converting the mechanical energy into AC electrical energy and transmitting it to the target large power grid.

The relationship of the power of the PV unit, the power of the energy storage device and the power of the target large power grid is as follows:

$$P_G = (P_S \cdot c_p + P_B \cdot c_b) \cdot c_d \cdot c_t$$

Wherein, $P_S$ is the power of the PV unit; $P_B$ is the operating power of the energy storage unit; $P_G$ is the power of the target large power grid; $c_p$ is the transfer coefficient of the energy transfer from the PV unit to the DC motor via the second converter unit; $c_b$ is the transfer coefficient of the energy transfer from the energy storage unit to the DC motor via the third converter unit; $c_d$ is the transfer efficiency of the energy transfer from the DC motor to the synchronous power generation unit; $c_t$ is the transfer efficiency of the energy transfer from the synchronous power generation unit to the target large power grid.

Figure 4:
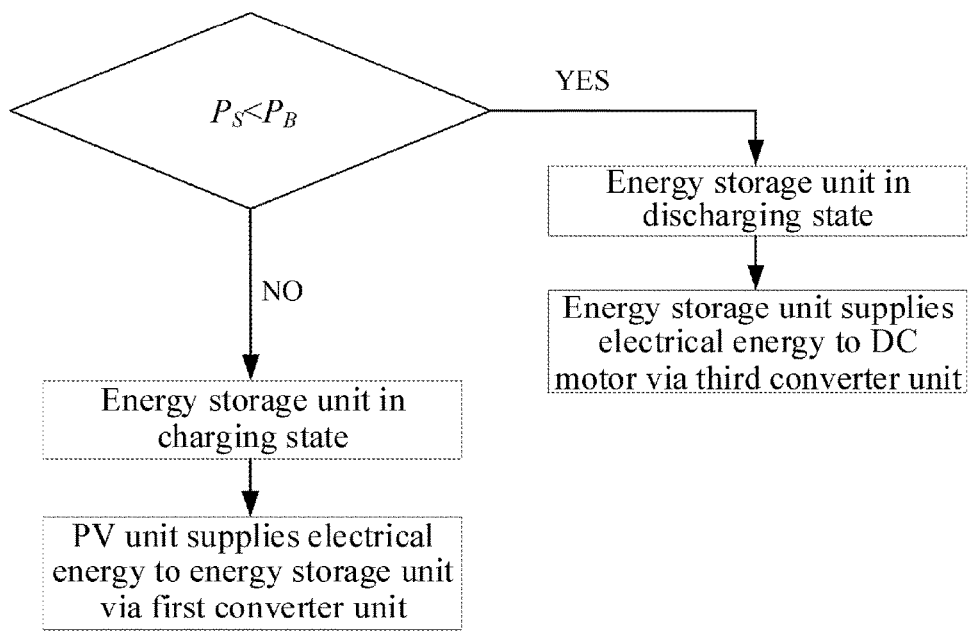
FIG. 4 is a flow diagram of a power adjustment in an operation of an energy storage unit in Example 2 of the present invention.

As shown in FIG. 4, the power $P_G$ of the target large power grid is calculated from the power $P_S$ of the PV unit and the real-time local load $P_L$, and a change rate $D_L$ of the local load at $t_g$ moment is as follows:

$$D_L(t_g) = \frac{P_L(t_g) - P_L(t_g - T_g)}{T_g}$$

Wherein, $T_g$ is a control interval.

According to the change rate $D_L$ of the local load at the $t_g$ moment, the power $P_G$ of the target large power grid can be expressed as follows:

$$P_G(t_g) = P_S(t_g - T_g) + k_g \cdot D_L(t_g)$$

Wherein, $k_g$ is the scaling factor, which can be determined by the daily average value $P_1$ of the local load and the daily average power $P_2$ of the solar PV generation, and existing $$k_g = \frac{P_1}{P_2}.$$

The energy storage unit adjusts the operating power $P_B$ of the energy storage unit based on the power $P_S$ of the PV unit and the power $P_G$ of the target large power grid, as follows:

$$P_B = \begin{cases} P_S \cdot c_p \cdot c_c - \dfrac{P_G \cdot c_c}{c_d \cdot c_t} & P_S \geq \dfrac{P_G}{c_p \cdot c_d \cdot c_t} \\ \dfrac{P_S \cdot c_p \cdot c_d \cdot c_t - P_G}{c_b \cdot c_d \cdot c_t} & P_S < \dfrac{P_G}{c_p \cdot c_d \cdot c_t} \end{cases}$$

Wherein, $c_c$ is the transfer efficiency of the energy transfer from the PV unit to the energy storage unit.

Under the constraint of the operating power $P_B$ of the energy storage unit, the operating power $P_B(t_g)$ of the energy storage unit at the $t_g$ moment can be expressed as follows:

$$P_B(t_g) = \begin{cases} P_B & -1 \cdot P_{B,min} \leq P_B \leq P_{B,max} \\ P_{B,max} & P_B \geq P_{B,max} \\ -1 \cdot P_{B,min} & P_B \leq -1 \cdot P_{B,min} \end{cases}$$

Wherein, $P_{B,max}$ is the maximum discharge power of the energy storage unit, $P_{B,min}$ is the maximum charge power of the energy storage unit.

At the $t_g$ moment, the charge state $E_B(t_g)$ of the energy storage unit can be expressed as follows:

$$E_B(t_g) = E_B(t_g - T_g) + T_g \cdot P_B(t_g)$$

Under the constraint of the energy storage unit charge state, the operating power $P_B(t_g)$ of the energy storage unit at the $t_g$ moment can be expressed as follows:

$$P_B(t_g) = \begin{cases} P_B(t_g) & E_{B,min} \leq E_B(t_g) \leq E_{B,max} \\ \dfrac{E_{B,max} - E_B(t_g - T_g)}{T_g} & E_B(t_g) \geq E_{B,max} \\ \dfrac{E_{B,min} - E_B(t_g - T_g)}{T_g} & E_B(t_g) \leq E_{B,min} \end{cases}$$

Figure 2:
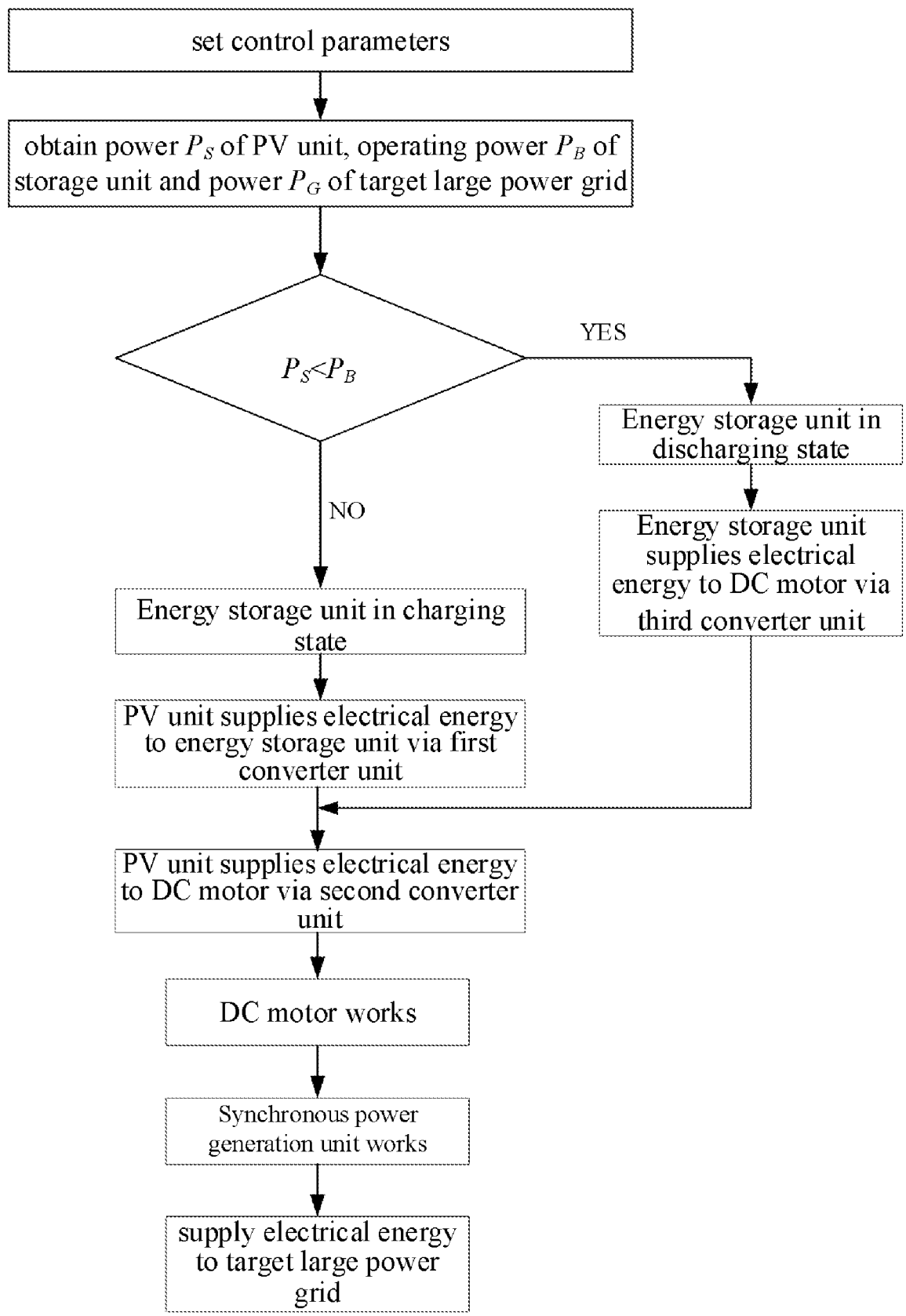
FIG. 2 is a flowchart of a working method of the physically synchronized solar-storage hybrid power generation system of Example 2 of the present invention.
Figure 5:
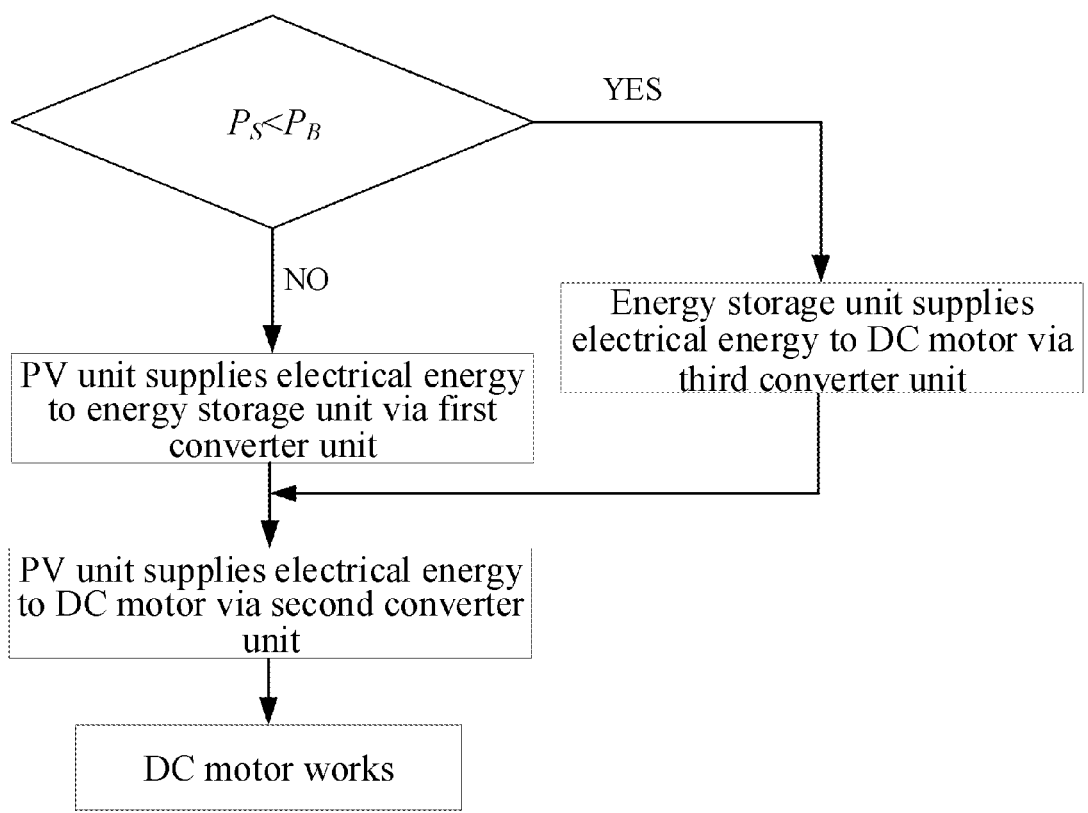
FIG. 5 is a flowchart of a judgment process of a power received by a DC motor in Example 2 of the present invention.

As shown in FIGS. 2 and 5, when the power $P_S$ of the PV unit is not less than the starting power of charging $$\frac{P_G}{c_p \cdot c_d \cdot c_t}$$

of the energy storage unit, i.e., $$P_S \geq \frac{P_G}{c_p \cdot c_d \cdot c_t},$$

the energy storage unit is in the charging state, and at this time, the DC motor only accepts the electrical energy from the first converter unit, and the PV unit supplies electrical energy $P_B(t_g)$ to the energy storage unit via the first converter unit.

When the power $P_S$ of the PV unit is less than the starting power of charging of the storage unit, i.e., $$P_S < \frac{P_G}{c_p \cdot c_d \cdot c_t},$$

the energy storage unit is in the discharging state, the DC motor receives both the electrical energy supplied by the PV unit via the second converter unit and the electrical energy supplied by the energy storage unit via the third converter unit, and if the PV power generation stops, the DC motor only receives the electrical energy supplied by the energy storage unit via the third converter unit; at this time, the electrical energy supplied by the third converter unit to the DC motor is $P_B(t_g)$.

The DC motor converts the obtained DC electrical energy into mechanical energy and transmits it to the synchronous power generation unit; the synchronous power generation unit is responsible for converting the mechanical energy supplied by the DC motor into AC electrical energy and transmitting it to the target large power grid, to complete the synchronous grid connection of the solar-storage hybrid power generation system.

Although the specific examples of the present invention are described above in combination with the accompanying drawings, it is not a limitation on the protection scope of the present invention. Those skilled in the art should understand that on the basis of the technical solution of the present invention, various modifications or deformations that can be made by those skilled in the art without creative labor are still within the protection scope of the present invention.

What is claimed is:

1. A physically synchronized solar-storage hybrid power generation system, comprising:
   a photovoltaic (PV) module, comprising a PV unit and a first converter unit and a second converter unit electrically connected to the PV unit, respectively;
   an energy storage module, comprising an energy storage unit and a third converter unit, a first end and a second end of the energy storage unit being electrically connected to the first converter unit and the third converter unit, respectively;
   a grid connection module, a first end thereof is electrically connected to the second converter unit and the third converter unit, and a second end thereof is connected to a target large power grid; and
   a control module, being electrically connected to the PV module, the energy storage module and the grid connection module, respectively, and being configured to set control parameters of the PV module and the energy storage module, and to adjust an operating state of the energy storage unit by judging a logical relationship between a power of the PV unit and a power of the target large power grid for synchronous grid connection of the solar-storage hybrid power generation system.

2. The physically synchronized solar-storage hybrid power generation system according to claim 1, wherein, further comprising a display module electrically connected to the control module.

3. The physically synchronized solar-storage hybrid power generation system according to claim 1, wherein, further comprising a monitoring module electrically connected to the control module, the PV module, the energy storage module and the grid connection module.

4. The physically synchronized solar-storage hybrid power generation system according to claim 1, wherein, the grid connection module comprises a DC motor and a synchronous power generation unit, and the synchronous power generation unit comprises a synchronous generator and an excitation device.

5. A working method of a physically synchronized solar-storage hybrid power generation system, employing the physically synchronized solar-storage hybrid power generation system of any one of claims 1 to 4, comprising the following steps:
   obtaining a power of a PV unit and determining a power of a target large power grid;
   obtaining a starting power of charging of an energy storage unit based on control parameters of a solar-storage hybrid power generation system and the obtained power of the target large power grid; and
   obtaining an operating state of the energy storage unit by judging a magnitude relationship between the power of the PV unit and the starting power of charging of the energy storage unit, and then carrying out a synchronous grid connection of the solar-storage hybrid power generation system.

6. The working method of the physically synchronized solar-storage hybrid power generation system according to claim 5, wherein, obtaining the power of the target large power grid before obtaining an operating power of the energy storage unit; the power of the target large power grid is determined based on the power of the PV unit, a real-time variation rate of a local load and a ratio coefficient between a daily average value of the local load and a daily average power of a solar PV generation.

7. The working method of the physically synchronized solar-storage hybrid power generation system according to claim 6, wherein, the control parameters of the solar-storage hybrid power generation system comprises a transfer coefficient $c_p$ of an energy transfer from the PV unit to the DC motor via the second converter unit, a transfer coefficient $c_b$ of an energy transfer from the energy storage unit to the DC motor via the third converter unit, a transfer efficiency $c_d$ of an energy transfer from the DC motor to the synchronous power generation unit and a transfer efficiency $c_t$ of an energy transfer from the synchronous power generation unit to the target large power grid.

8. The working method of the physically synchronized solar-storage hybrid power generation system according to claim 7, wherein, the power of the target large power grid is related to the power of the PV unit, the operating power of the energy storage unit and the control parameters of the solar-storage hybrid power generation system.

9. The working method of the physically synchronized solar-storage hybrid power generation system according to claim 5, wherein,
   when the power of the PV unit is not less than the starting power of charging of the energy storage unit, the PV unit supplies electrical energy to the energy storage unit via the first converter unit, and the energy storage unit is in a charging state, the DC motor only receives the electrical energy supplied by the PV unit via the second converter unit; and
   when the power of the PV unit is less than the starting power of charging of the energy storage unit, the PV unit no longer supplies electrical energy to the energy storage unit via the first converter unit, and the energy storage unit is in a discharging state, the DC motor receives both the electrical energy supplied by the PV unit via the second converter unit and the electrical energy supplied by the energy storage unit via the third converter unit; and if the PV power generation stops, the DC motor only receives the electrical energy supplied by the energy storage unit via the third converter unit.

10. The working method of the physically synchronized solar-storage hybrid power generation system according to claim 5, wherein, the DC motor converts the received DC electrical energy into a mechanical energy, which is converted into an AC electrical energy based on the synchronous generator, and then the electrical energy is integrated into the target large power grid after a voltage thereof is adjusted by the excitation device.

\* \* \* \* \*